(12) United States Patent
Philbrook

(10) Patent No.: US 9,327,999 B1
(45) Date of Patent: May 3, 2016

(54) COMPACT INCLINED PLATE SEDIMENTATION DEVICE AND METHODS

(71) Applicant: M2 Water Treatment Inc., Raleigh, NC (US)

(72) Inventor: David Philbrook, Raleigh, NC (US)

(*) Notice: Subject to any disclaimer, the term of this patent is extended or adjusted under 35 U.S.C. 154(b) by 142 days.

(21) Appl. No.: 14/207,402

(22) Filed: Mar. 12, 2014

Related U.S. Application Data

(60) Provisional application No. 61/785,401, filed on Mar. 14, 2013.

(51) Int. Cl.
| | | |
|---|---|---|
| *B01D 21/02* | (2006.01) | |
| *B01D 21/28* | (2006.01) | |
| *C02F 1/34* | (2006.01) | |
| *B01D 21/00* | (2006.01) | |

(52) U.S. Cl.
CPC ............. *C02F 1/34* (2013.01); *B01D 21/0045* (2013.01); *B01D 21/0072* (2013.01); *B01D 21/0075* (2013.01); *B01D 21/283* (2013.01)

(58) Field of Classification Search
CPC .......... B01D 21/0045; B01D 21/0051; B01D 21/0069; B01D 21/0072; B01D 21/0075; B01D 21/283
USPC ......................................... 210/802, 521, 522
See application file for complete search history.

(56) References Cited

U.S. PATENT DOCUMENTS

| | | | | |
|---|---|---|---|---|
| 2,973,866 | A | * | 3/1961 | Genter ............... B01D 21/0045 210/519 |
| 3,529,728 | A | * | 9/1970 | Middelbeek ....... B01D 17/0211 210/522 |
| 3,894,955 | A | * | 7/1975 | Forsell ................. B01D 21/283 210/322 |
| 3,903,000 | A | * | 9/1975 | Miura .................. B01D 21/283 210/521 |
| 4,089,782 | A | | 5/1978 | Huebner |
| 4,120,796 | A | | 10/1978 | Huebner |
| 4,120,797 | A | | 10/1978 | Huebner |
| 4,151,084 | A | | 4/1979 | Probstein et al. |
| 4,351,733 | A | | 9/1982 | Salzer et al. |
| 4,544,487 | A | | 10/1985 | Bosnjak |
| 4,595,504 | A | | 6/1986 | Hellman et al. |
| 4,889,624 | A | | 12/1989 | Soriente et al. |
| 5,049,278 | A | | 9/1991 | Galper |
| 5,547,569 | A | | 8/1996 | Spencer |
| 6,817,476 | B2 | | 11/2004 | Donnick et al. |
| 7,850,860 | B2 | | 12/2010 | Dissinger |
| 8,337,706 | B2 | | 12/2012 | McCabe |

(Continued)

OTHER PUBLICATIONS

Hendricks, David W., Water Treatment Unit Processes: Physical and Chemical, 2006, pp. 184-194, CRC Press, Taylor and Francis Group, USA. ISBN 9781420061918.

(Continued)

*Primary Examiner* — Christopher Upton
(74) *Attorney, Agent, or Firm* — NK Patent Law, PLLC

(57) ABSTRACT

An inclined plate sedimentation device includes a plurality of parallel spaced inclined plates, each at a plate inclination angle relative to a horizontal axis, an influent fluid source that provides a fluid to the device such that the fluid flows between the inclined plates, and at least one vibratory source operatively coupled to at least one of the inclined plates for providing vibration. The inclined plates have tapered lower ends for reducing eddy currents between adjacent inclined plates upon vibration. The vibratory source may be at least one of mechanical, electrical, air-driven, hydraulic-driven, a sonic wave device, and a microwave device.

17 Claims, 5 Drawing Sheets

(56) References Cited

U.S. PATENT DOCUMENTS

| | | | |
|---|---|---|---|
| 8,691,097 B2 | 4/2014 | McCabe | |
| 8,945,401 B2 | 2/2015 | Cook et al. | |
| 2008/0230088 A1* | 9/2008 | Guo | B01D 21/283 210/525 |
| 2008/0314823 A1* | 12/2008 | Kulick, III | B01D 21/0069 210/521 |
| 2011/0278239 A1* | 11/2011 | Roberts | B01D 21/0045 210/521 |

OTHER PUBLICATIONS

American Water Works Association, Water Quality and Treatment, 1990, pp. 407-411, McGraw-Hill, Inc., USA, ISBN 0-07-001540-6.

* cited by examiner

COMPACT INCLINED PLATE SEDIMENTATION DEVICE AND METHODS

CROSS-REFERENCE TO RELATED APPLICATION

This application claims the benefit of priority of U.S. provisional patent application No. 61/785,401, titled "COMPACT LEMELLA SEDIMENTATION DEVICE HAVING IMPROVED INFLUENT FLOW AND RELATED METHODS," filed on Mar. 14, 2013, which is incorporated herein in its entirety by this reference.

TECHNICAL FIELD

This disclosure relates generally to sedimentation devices and methods, and more particularly relates to inclined parallel plate sedimentation devices and methods in which a small footprint, improved flow, and reduced re-entrainment are achieved.

BACKGROUND

Inclined parallel plate sedimentation devices and methods are well-known treatment for separating solid or liquid sedimentable constituents from a liquid and are used especially for treating water, such as drinking water, industrial waste water, and sewage, and in product separation and purification. Flocculated water and other mixed solutions contains material that should be separated to promote public safety, satisfy regulatory requirements, maintain processing facilities, improve presentability, and/or increase purity or recovery. Sedimentation is also used for purifying products or concentrating solids. For example, sedimentation could be used to help remove solids from oils or for harvesting algae from an algae farm.

Inclined parallel plate separator devices are sometimes used to treat mixed solutions by separating sedimentable solids from liquids. However, conventional devices are generally large and require a substantial footprint on a floor space. Lending to the size of a typical inclined plate separator is the angle of the plates along which solutions travel along the plates. Typical inclined plate systems have plate angles near sixty (60) degrees relative to the horizontal. Inclined plates at a lower angle using conventional technology tend to permit solids to settle and build up between plates, limiting the area available for flow and thereby increasing liquid velocity and the potential to re-suspend solids. Such circumstances reduce the effectiveness of such devices.

A need therefore exists for devices and methods that address these disadvantages. Devices and methods are needed for providing greater settling areas while avoiding blockage caused by build-up along an inclined plate, and reducing the footprint and costs of sedimentation systems.

SUMMARY

This Summary is provided to introduce in a simplified form concepts that are further described in the following detailed descriptions. This Summary is not intended to identify key features or essential features of the claimed subject matter, nor is it to be construed as limiting the scope of the claimed subject matter.

In at least one embodiment, an inclined plate sedimentation device includes a plurality of parallel spaced inclined plates, each at a plate inclination angle relative to a horizontal axis, an influent fluid source that provides a fluid to the device such that the fluid flows between the inclined plates, and at least one vibratory source operatively coupled to at least one of the inclined plates for providing vibration.

In at least one example, the inclined plates have tapered lower ends for reducing eddy currents between adjacent inclined plates upon vibration. The vibratory source may be at least one of mechanical, electrical, air-driven, hydraulic-driven, a sonic wave device, and a microwave device.

In at least one example, a control module is in operative communication with the vibratory source. The control module and vibratory source are configured such that amplitude and frequency of vibration by the vibratory source can be controlled by the control module.

In at least one example, the at least one vibratory source is operatively coupled to at least one inclined plate for providing vibration along a longitudinal axis inclined at the plate inclination angle relative to the horizontal axis. The at least one vibratory source may be operatively coupled to at least one inclined plate for providing vibration along at least one axis perpendicular to the longitudinal axis.

In at least one example, each inclined plate includes a planar upper surface inclined at the plate inclination angle relative to the horizontal axis, and a lower tapered end defined by a lower tapered face opposite the upper surface. A taper angle is defined between the upper surface and the tapered face. A tapered face inclination angle is defined between the tapered face and the horizontal axis. In at least one example, the sum of the taper angle and the tapered face inclination angle is approximately the plate inclination angle.

In at least one example, an inclined plate includes at least two walls that extend longitudinally along the inclined plate. Each wall extends upward from an upper surface of the inclined plate such that at least one longitudinal channel is defined above the upper surface and between the two walls. The walls may extend upward from the upper surface of an inclined plate toward a lower surface of an adjacent inclined plate such that a tube is defined.

In at least one embodiment, a method of treating a fluid includes providing a fluid to an inclined plate sedimentation device. The device includes a plurality of parallel spaced inclined plates between which the fluid travels downward. Each inclined plate is inclined at a plate inclination angle relative to a horizontal axis. The inclined plates are vibrated as the fluid travels upward between the inclined plates.

In at least one example, the inclined plate sedimentation device includes a vibratory source that is at least one of mechanical, electrical, air-driven, hydraulic-driven, a sonic wave device, and a microwave device. The method may include controlling an amplitude and a frequency of vibration. Vibrating the inclined plates may include providing a vibration movement component along a longitudinal axis inclined at the plate inclination angle relative to the horizontal axis. Vibrating the inclined plates may include providing a vibrational movement component along at least one axis perpendicular to the longitudinal axis.

In at least one example, providing the fluid to the inclined plate sedimentation device includes the fluid moving upward between the inclined plates.

In at least one example, each inclined plate includes a planar upper surface inclined at the plate inclination angle relative to the horizontal axis, and a lower tapered end defined by a lower tapered face opposite the upper surface. A taper angle is defined between the upper surface and the tapered face. A tapered face inclination angle is defined between the tapered face and the horizontal axis.

In at least one example, at least one inclined plate includes at least two walls that extend longitudinally along the inclined plate, each wall extending upward from an upper surface of the inclined plate such that at least one longitudinal channel is defined above the upper surface and between the two walls.

In at least one example, a plurality of walls are provided extending upward from upper surfaces of the inclined plates such that the fluid travels upward between the inclined plates in channels defined by the walls.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Figure 1:
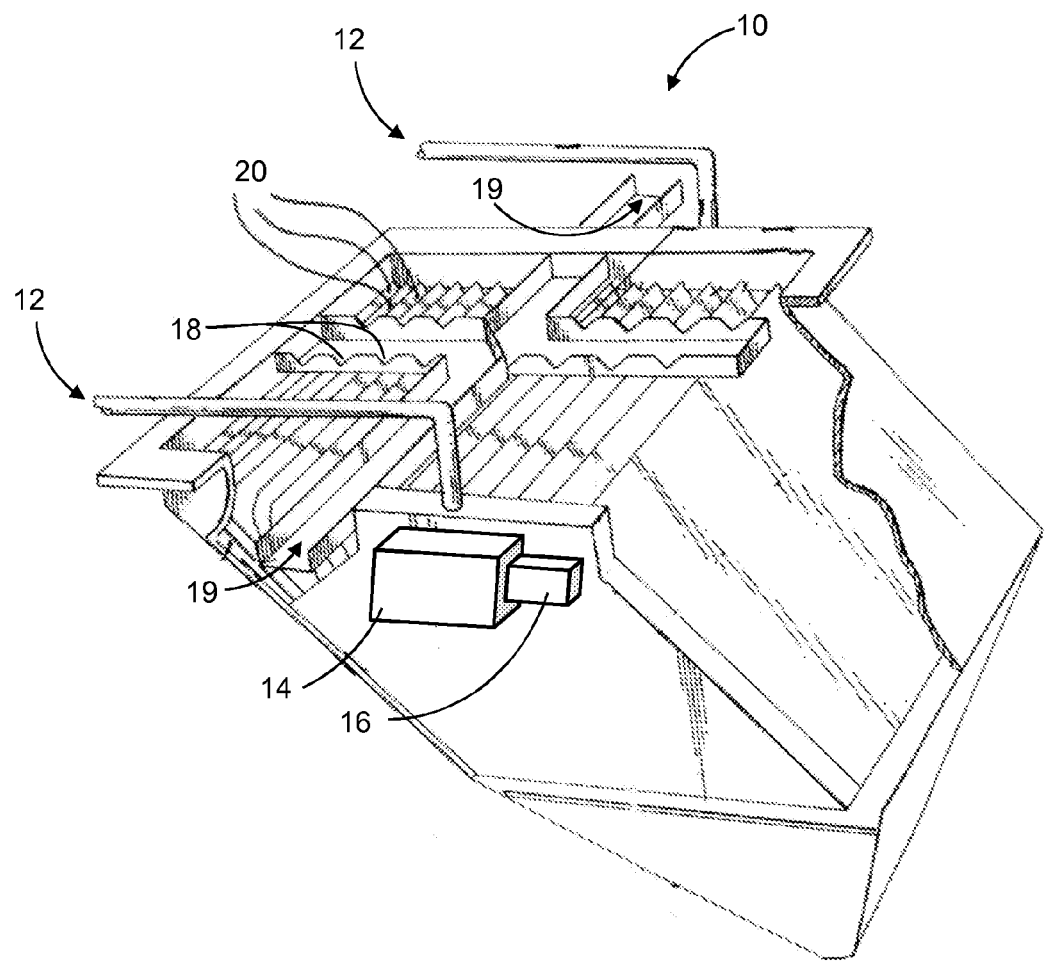
FIG. 1 is an illustration of an inclined plate sedimentation device according to at least one embodiment.

FIG. 1 is an illustration of a sedimentation device 10 according to at least one embodiment. The device 10 is useful for separating entrained material from an influent fluid such as flocculated water from a sewer or industrial wastewater source. The device 10 is also useful in product purification processes. The illustrated device 10 includes fluid supply lines 12 from which fluids flow internally down the sides of the device to the bottom thereof. Fluids then flow upward, filling the device to the level of notches 18 formed along walls of exit channel 19. Supply lines 12 define influent fluid sources that provide mixed solutions of solids and liquids, from which removal of solids is desired. Channels 19 define exits from which the liquid relatively free of the solids exit the device. In that and some other respects, the sedimentation device 10 resembles a device represented in FIG. 1 of U.S. Pat. No. 4,595,504. However, considerable differences and advantageous improvements are made in the device 10 relative to that of the afore-mentioned patent.

For example, the device 10 includes a vibratory source 14 and a control module 16 by which the vibratory source is controlled. The vibratory source 14 imparts vibratory motion to a plurality of closely spaced, uniformly separated, parallel inclined sedimentation plates 20, between which mixed solutions from the influent fluid source 12 flow upward, from the bottom of the device. In a successful separation process, the solids are separated from the liquid as the mixed solution travels upward within the device between the plates 20, with the separated solids ultimately reaching the bottom of the device and the liquids exiting the top of the device. Vibratory motion of the plates 20 advantageously improves the separation process.

Figure 2:
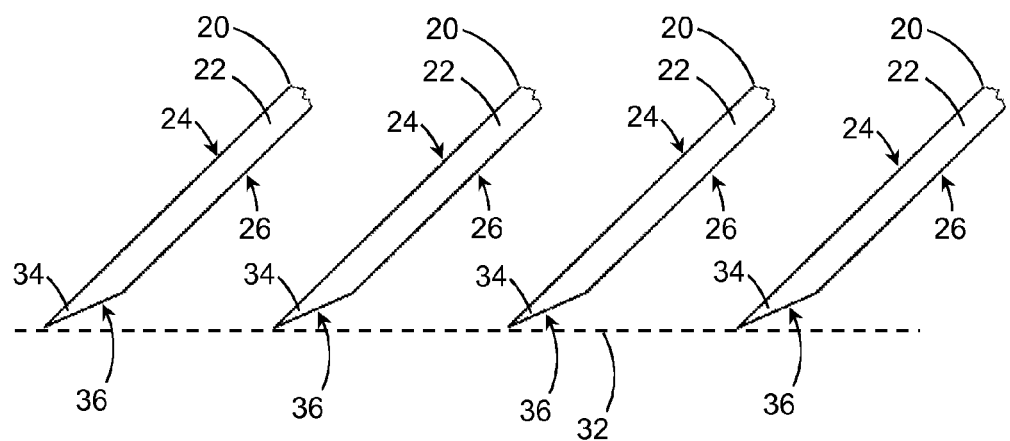
FIG. 2 illustrates inclined plates for use in the device of FIG. 1, according to at least one embodiment, disposed at a plate inclination angle relative to a horizontal axis.

Furthermore, the inclined plates 20 are configured with particular advantageous features over the lamellas of the device of the afore-mentioned patent. In particular, as illustrated in FIG. 2, each plate 20 is formed as a generally planar body 22 having upper and lower parallel surfaces 24 and 26, each of which is disposed at a plate inclination angle 28 (FIG. 3) relative to an axis 32 illustrated generally as horizontal in the drawings. The plate inclination angle 28 is advantageously selected for sedimentation purposes. Too steep of an angle 28 may hinder the settling of solids in the device 10 and too shallow of an angle 28 may cause the solids to no longer flow down along the plates 20 and instead deposit thereon, restricting influent flow.

In at least one embodiment, however, mixed solutions enter the top of the device and flow downward along the inclined plates 20, with solids separating from the liquids along the plates.

The inclined plates 20 have bottom ends 34 (FIG. 2) aligned with respect to the horizontal axis 32. The ends 34 in the illustrated embodiments are tapered, each having a lower tapered face 36 opposite the upper surface 24. A taper angle 38 (FIG. 3) is defined between each upper surface 24 and a respective opposing tapered face 36. A tapered face inclination angle 40 (FIG. 3) is defined between each lower tapered face 36 and the horizontal axis 32. The sum of the taper angle 38 and the tapered face inclination angle 40 is approximately the plate inclination angle 28. Each lower tapered face 36 is defined at the outlet side of its inclined plate 20 for reducing eddy currents between adjacent inclined plates, which are vibrated in at least some embodiments of the device 10. Such eddy currents can otherwise re-entrain settled solids as they flow off the bottom of the plates.

The vibratory source 14 (FIG. 1) is operatively coupled to the inclined plates 12 for providing vibratory forces thereto. The vibratory source 14 may be mechanical, electrical, air-driven, hydraulic-driven and/or may produce sonic waves, microwaves, and/or combinations thereof. The vibratory source 14 may be configured such that the amplitude and frequency of vibration can be controlled by the control module 16, which is in operative communication with the vibratory source 14. The illustration in FIG. 1 represents at least one embodiment in which a single vibratory device is mechanically coupled to all of the inclined plates. The illustration in FIG. 1 also represents at least one other embodiment in which a dedicated vibratory source 14 is operatively coupled only to one or more particular inclined plates 20. Thus, any number of vibratory sources is represented. For example, in at least one embodiment, independently controllable vibratory sources are in one-to-one correspondence with the inclined plates, such that vibration of each plate can be independently controlled.

Figure 3:
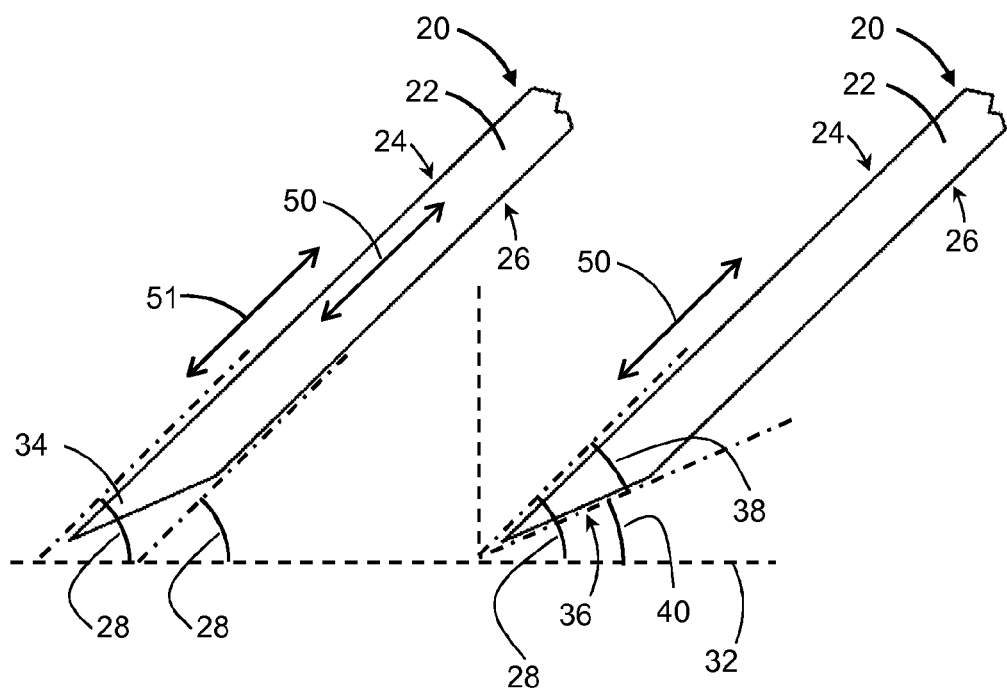
FIG. 3 further illustrates tapered ends and vibratory motion applied to the inclined plates of FIG. 2.
Figure 4:
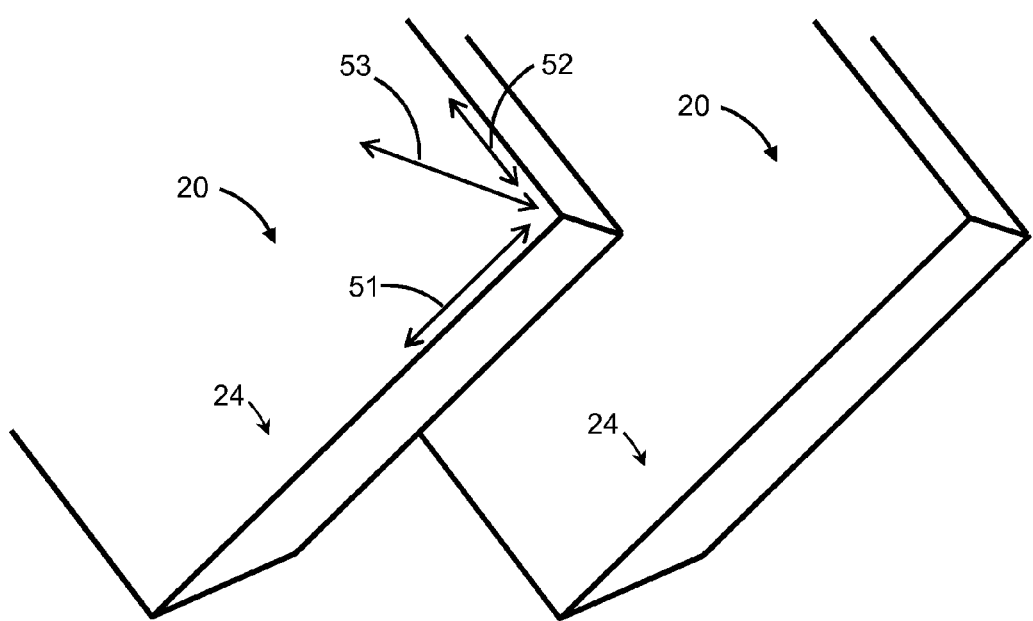
FIG. 4 is a perspective view of inclined plates to which vibratory motion may be applied to three orthogonal axes.

In at least one mode of operation, each inclined plate 20 vibrates along a flat longitudinal aspect thereof as illustrated in FIG. 3, in which at least a directional component of the vibratory motion is a longitudinal component 50 along a longitudinal axis 51 (FIG. 4). The longitudinal axis 51 is inclined at the plate inclination angle 28 of (FIG. 3) relative to the horizontal axis 32. It is expected that longitudinal vibratory motion 50 may particularly break any bonds that might form between the inclined plates 20 and solids from fluids under separation treatment. Vibratory motion of each inclined plate can include laterally directed motion along a lateral axis 52 as well, further inhibiting such undesired bonding. Vibratory motion of each inclined plate can further include perpendicular vibratory motion along a normal axis 53 as well, extending along the normal vector of each planar plate. For example, it is expected that perpendicular vibratory motion along the normal axis 53 may particularly fluidize settled particles and promote their motion down each inclined plate 20 as liquid flows upward. The longitudinal axis 51, lateral axis 52, and normal axis 53 are mutually perpendicular. Vibration in any direction having any directional components along theses axes can be provided. That is, vibration at any angle or direction between the three axes can be provided.

A method of treating influent liquid is also provided herein. The method includes using the device 10 according to any of the embodiments disclosed herein. The method may also include passing influent liquid into the device through influent source 12, and imparting a vibration to at least one of the plurality of inclined plates 20 through the vibratory source 14.

Vibration applied to the inclined plates 20 and/or plate sedimentation device 10 overall was determined to improve the flow of settled solids down the plates and allow for a reduced plate inclination angle 28 (FIG. 3) thereby reducing the overall size of the sedimentation device.

In at least one investigation, a fifty (50) degree plate inclination angle 28 (FIG. 3) was determined to be needed for fine silt solids which had settled on the plate to flow down the plate without vibratory motion applied by the vibratory source 14. At any plate inclination angle 28 less than approximately fifty (50) degrees, without vibratory motion applied, the silt solids no longer flowed down the plate but built up. The buildup of settled solids limits the open area between the plates thereby increasing the liquid velocity between the plates which further reduces the sedimentation effectiveness of the device. Eventually, such solids can build to such an extent that they reduce the area for the liquid to flow along the inclined plates 20, thereby increasing the liquid velocity along areas where there is liquid movement. This leads to unpredictable and undesirable results in the faster moving areas such as little or no settling occurring, and/or re-entrainment of solids in the faster flow.

Advantageously, vibratory motion was applied to the plates 20 and it was determined that only a thirty (30) degree plate inclination angle 28 (FIG. 3) was needed for silt solids to flow down the inclined plate 20. This difference from a fifty (50) degree plate inclination angle to a thirty (30) degree plate inclination angle may result in reducing the size of the system by almost half, advantageously minimizing capital and installation costs and saving space. A further enhancement is the tapered bottom ends of the plates, which minimize eddy currents that may form from the vibrating plates.

Figure 5:
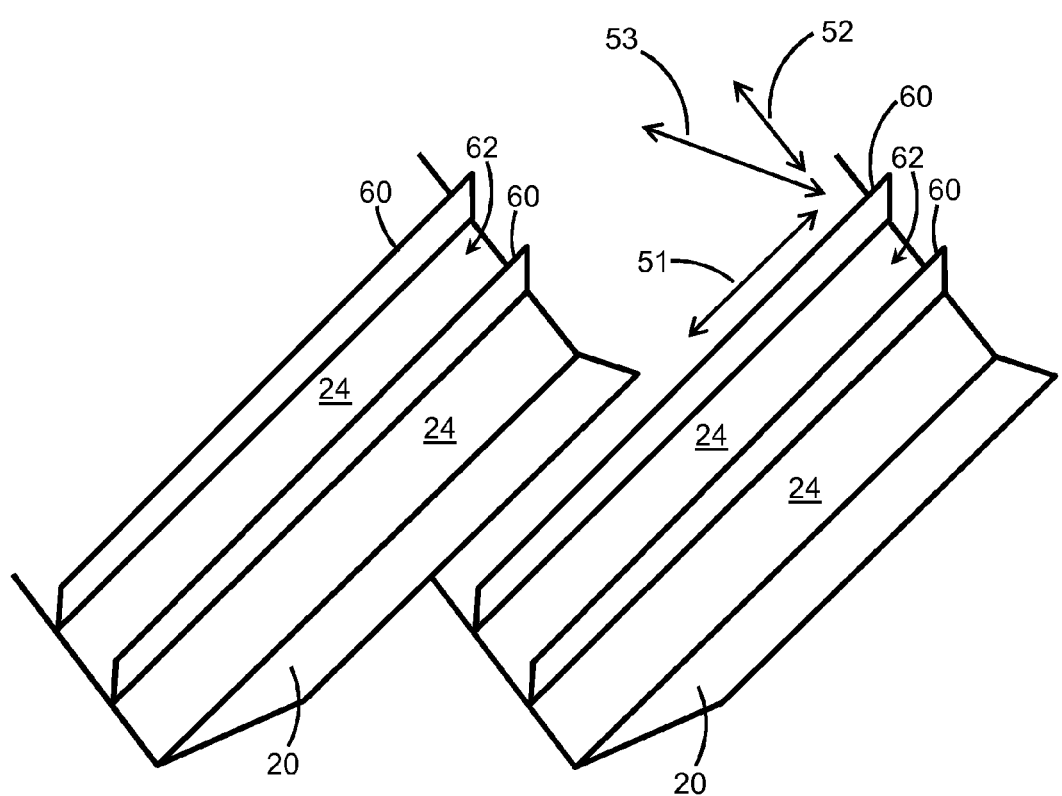
FIG. 5 is a perspective view of inclined plates having vertical fins defining channels or tubes that prevent lateral flow.

In FIG. 5, the plates 20 have walls 60 that extend longitudinally parallel to the longitudinal axis 51. Each wall 60 extends upward from the upper surface 24 in the direction of the normal axis 53. Longitudinal channels 62 are defined along the plates 20 between the walls 60. Lateral flow of fluids across any given plate 20 is blocked by the walls 60, with flow being confined within the channels 62. The walls 60 may or may not extend far enough upward from a given upper surface 24 to contact an adjacent plate 20 from below, such that the channels 62 may open upward, or may be defined as tubes.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. An inclined plate sedimentation device, comprising:
   a plurality of parallel spaced inclined plates, each at a plate inclination angle relative to a horizontal axis;
   an influent fluid source that provides a fluid to the device such that the fluid flows between the inclined plates; and
   at least one vibratory source operatively coupled to at least one of the inclined plates for providing vibration,
   wherein each inclined plate comprises:
   a planar upper surface inclined at the plate inclination angle relative to the horizontal axis; and
   a lower tapered end defined by a lower tapered face opposite the upper surface such that a taper angle is defined between the upper surface and the tapered face, and
   a tapered face inclination angle is defined between the tapered face and the horizontal axis.

2. An inclined plate sedimentation device according to claim 1, wherein the inclined plates have tapered lower ends for reducing eddy currents between adjacent inclined plates upon vibration.

3. An inclined plate sedimentation device according to claim 1, wherein the vibratory source is at least one of mechanical, electrical, air-driven, hydraulic-driven, a sonic wave device, and a microwave device.

4. An inclined plate sedimentation device according to claim 1, further comprising a control module in operative communication with the vibratory source, the control module and vibratory source configured such that amplitude and frequency of vibration by the vibratory source can be controlled by the control module.

5. An inclined plate sedimentation device according to claim 1, wherein the at least one vibratory source is operatively coupled to at least one inclined plate for providing a vibrational movement component along a longitudinal axis inclined at the plate inclination angle relative to the horizontal axis.

6. An inclined plate sedimentation device according to claim 5, wherein the at least one vibratory source is operatively coupled to at least one inclined plate for providing a vibrational movement component along at least one axis perpendicular to the longitudinal axis.

7. An inclined plate sedimentation device according to claim 1, wherein the sum of the taper angle and the tapered face inclination angle is approximately the plate inclination angle.

8. An inclined plate sedimentation device according to claim 1, wherein at least one inclined plate comprises at least two walls that extend longitudinally along the inclined plate, each wall extending upward from an upper surface of the inclined plate such that at least one longitudinal channel is defined above the upper surface and between the two walls.

9. An inclined plate sedimentation device according to claim 8, wherein the two walls extend upward from the upper surface of the inclined plate toward a lower surface of an adjacent inclined plate such that at least one tube is defined.

10. A method of treating a fluid, the method comprising:
    providing a fluid to an inclined plate sedimentation device comprising a plurality of parallel spaced inclined plates between which the fluid travels, each inclined plate inclined at a plate inclination angle relative to a horizontal axis; and
    vibrating the inclined plates as the fluid travels between the inclined plates, wherein each inclined plate comprises:
- a planar upper surface inclined at the plate inclination angle relative to the horizontal axis; and
- a lower tapered end defined by a lower tapered face opposite the upper surface such that a taper angle is defined between the upper surface and the tapered face, and
- a tapered face inclination angle is defined between the tapered face and the horizontal axis.

11. A method according to claim 10, wherein the inclined plate sedimentation device comprises a vibratory source that is at least one of mechanical, electrical, air-driven, hydraulic-driven, a sonic wave device, and a microwave device.

12. A method according to claim 10, further comprising controlling an amplitude and a frequency of vibration.

13. A method according to claim 10, wherein vibrating the inclined plates comprises providing a vibrational movement component along a longitudinal axis inclined at the plate inclination angle relative to the horizontal axis.

14. A method according to claim 13, wherein vibrating the inclined plates comprises providing a vibrational movement component along at least one axis perpendicular to the longitudinal axis.

15. A method according to claim 10, wherein providing the fluid to the inclined plate sedimentation device comprises the fluid flowing upward between the inclined plates.

16. A method according to claim 10, wherein at least one inclined plate comprises at least two walls that extend longitudinally along the inclined plate, each wall extending upward from an upper surface of the inclined plate such that at least one longitudinal channel is defined above the upper surface and between the two walls.

17. A method according to claim 10, the inclined plate sedimentation device further comprising providing a plurality of walls extending upward from upper surfaces of the inclined plates such the fluid travels upward between the inclined plates in channels defined by the walls.

* * * * *